United States Patent
Zhang et al.

(10) Patent No.: US 12,153,247 B2
(45) Date of Patent: Nov. 26, 2024

(54) BACKLIGHT MODULE AND DISPLAY PANEL

(71) Applicant: Wuhan China Star Optoelectronics Technology Co., Ltd., Hubei (CN)

(72) Inventors: Zhihan Zhang, Hubei (CN); Zheng Zhou, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/442,227

(22) PCT Filed: Jul. 16, 2021

(86) PCT No.: PCT/CN2021/106657
§ 371 (c)(1),
(2) Date: Sep. 23, 2021

(87) PCT Pub. No.: WO2022/262046
PCT Pub. Date: Dec. 22, 2022

(65) Prior Publication Data
US 2024/0019627 A1     Jan. 18, 2024

(30) Foreign Application Priority Data

Jun. 16, 2021  (CN) .......................... 202110666681.5

(51) Int. Cl.
*F21V 8/00* (2006.01)
(52) U.S. Cl.
CPC ........... *G02B 6/0088* (2013.01); *G02B 6/009* (2013.01)

(58) Field of Classification Search
CPC .............................. G02B 6/0088; G02B 6/009
See application file for complete search history.

(56) References Cited

U.S. PATENT DOCUMENTS

| | | |
|---|---|---|
| 2010/0165231 A1 | 7/2010 | Ho et al. |
| 2019/0019445 A1* | 1/2019 | Xu .......................... G09G 3/22 |

FOREIGN PATENT DOCUMENTS

| | | |
|---|---|---|
| CN | 201903730 | 7/2011 |
| CN | 203414694 | 1/2014 |
| CN | 204406000 | 6/2015 |
| CN | 205174253 | 4/2016 |
| CN | 206162012 | 5/2017 |
| CN | 206207166 | 5/2017 |
| CN | 209433160 | 9/2019 |
| CN | 210244022 | 4/2020 |
| CN | 111965892 | 11/2020 |

OTHER PUBLICATIONS

Chen, CN 110208988, Sep. 2019 (Year: 2019).*

* cited by examiner

*Primary Examiner* — Mary Ellen Bowman

(57) ABSTRACT

A backlight module and a display panel are provided. The backlight module includes a first engagement structure and a second engagement structure. By engaging the first engagement structure with the second engagement structure, a sealant and a bottom frame are fixed to each other to fix an optical film, thereby preventing the optical film from shifting and vibration scratches. Therefore, it is prevented to provide a positioning post for fixing the optical film on the light guide plate, and the applicability of a thermal-pressing process of the light guide plate is improved.

12 Claims, 3 Drawing Sheets

BACKLIGHT MODULE AND DISPLAY PANEL

RELATED APPLICATIONS

This application is a National Phase of PCT Patent Application No. PCT/CN2021/106657 having International filing date of Jul. 16, 2021, which claims the benefit of priority of Chinese Patent Application No. 202110666681.5 filed on Jun. 16, 2021. The contents of the above applications are all incorporated by reference as if fully set forth herein in their entirety.

FIELD AND BACKGROUND OF THE INVENTION

The present disclosure relates to the field of display technologies, in particular to a backlight module and a display panel.

Display devices can convert computer data into various characters, numbers, symbols, or intuitive images for display. Also, keyboards and other input tools can be used to input commands or data into computers, and hardware and software of systems can be used to add, delete, and change display content at any time. Display devices are divided into plasma, liquid crystal, light emitting diode, and cathode ray tube types according to display elements.

Liquid crystal displays (LCDs) are based on liquid crystal materials. The liquid crystal materials are filled between two parallel plates. A voltage is applied to change arrangement of molecules inside the liquid crystal materials, to block light or transmit light, thereby displaying a well-arranged image with different shades. Moreover, color images can be displayed by adding a tricolor filter layer between two flat plates.

Nowadays, LCD screens are becoming more and more popular in vehicle displays, thanks to the integration of more functions in vehicle instruments. A narrow bezel design has become a hot spot in development of displays in recent years. Users have put forward higher requirements on appearance and dimensions of the vehicle displays in order to achieve a narrow bezel display. At present, most vehicle displays use side-entry backlight modules. The narrow bezel design of the backlight module plays a vital role in the narrow bezel design of an entire vehicle display screen.

SUMMARY OF THE INVENTION

Due to use environments and high reliability requirements of in-vehicle products, optical films inside backlight modules needs to be fixed to prevent displacement and abnormal noise. Existing backlight modules of vehicle displays are provided with positioning posts on light guide plates to fix the optical films, so as to prevent the optical films from shifting and vibration scratches. Limited by a narrow bezel of the backlight module, generally there is enough space on an IC side to design the positioning posts of the light guide plate and dispose LEDs. When designing the positioning posts of the light guide plate on a light entrance side (LED side), the positioning posts will cause light emitted by LED light sources to enter, and edges of the positioning posts will affect the light transmission. Improper control of a width and a position of the positioning post may lead to uneven brightness near the positioning post, resulting in local bright spots or bright lines, and affecting visual performance of final products. Therefore, a new type of backlight module and display panel is needed to solve the above-mentioned problems.

A purpose of the present disclosure is to provide a backlight module and a display panel, which can solve following problems. Existing backlight modules are provided with positioning posts on light guide plates to fix the optical films, the positioning posts will affect the light transmission. Improper control of a width and a position of the positioning post may lead to uneven brightness near the positioning post, resulting in local bright spots or bright lines, and affecting visual performance of final products.

In order to solve the above problems, the present disclosure provides a backlight module, which includes a bottom frame, an optical film, and a sealant. The bottom frame includes a bottom plate and a side plate connected to a periphery of the bottom plate. The bottom plate and the side plate together form an accommodation chamber. The optical film is disposed on the bottom plate and disposed in the accommodation chamber. The sealant surrounds on an outside of the side plate and extends to cover a surface of the optical film away from the bottom plate. A first engagement structure formed on the surface of the optical film away from the bottom plate. A second engagement structure formed on a surface of the sealant facing the optical film. The second engagement structure and the first engagement structure are engaged with each other, and are disposed on a side of the optical film away from the bottom plate.

Furthermore, the optical film includes a first optical film disposed on the bottom plate and disposed in the accommodation chamber; a second optical film disposed on a surface of the first optical film away from the bottom plate; and a third optical film disposed on a surface of the second optical film away from the bottom plate. The second optical film includes a first through hole, the third optical film includes a second through hole, at least one portion of the first through hole is formed in the second through hole, and the first through hole and the second through hole together form the first engagement structure.

Furthermore, the first through hole is completely formed in the second through hole, the first engagement structure formed by the first through hole and the second through hole is a first step-shaped structure, and the second engagement structure is a second step-shaped structure that engages with the first step-shaped structure.

Furthermore, the backlight module further includes a light guide plate disposed between the bottom plate and the optical film and disposed in the accommodation chamber; and a light source disposed between the light guide plate and the side plate and fixed on an inner side wall of the side plate. The first engagement structure is disposed on a same side as the light source.

Furthermore, the sealant includes: a sealant body parallel to the side plate of the bottom frame; and an extension plate connected to one end of the sealant body and perpendicular to the side plate of the bottom frame. The second engagement structure is disposed in a middle of the extension plate of the sealant.

Furthermore, the backlight module further includes a double-sided adhesive tape attached between the first engagement structure and the second engagement structure, and partially extends to over the optical film.

Furthermore, the double-sided adhesive tape is a double-sided black-white adhesive tape including a black side and a white side. The black side faces the optical film, and the white side faces the sealant.

Furthermore, the light source is fixed on the inner side wall of the side plate through a thermally conductive adhesive.

Furthermore, the side plate is fixed to the sealant through a fastening structure.

In order to solve the above-mentioned problems, the present disclosure also provides a display panel, which includes the backlight module of the present disclosure.

The present disclosure relates to the backlight module and the display panel. The first engagement structure is disposed on the surface of the optical film away from the bottom plate. The second engagement structure is disposed on the surface of the sealant facing the optical film. The first engagement structure and the second engagement structure are engaged to each other. The sealant and the bottom frame are fixed to each other to fix the optical film, thereby preventing a shift and vibration scratches of the optical film. Therefore, it is prevented to provide a positioning post for fixing the optical film on the light guide plate, and the applicability of a thermal-pressing process of the light guide plate is improved. In the present disclosure, the double-sided adhesive tape is also disposed between the first engagement structure and the second engagement structure to further fix the optical film and prevent the optical film from shifting and shaking.

BRIEF DESCRIPTION OF THE SEVERAL VIEWS OF THE DRAWINGS

In order to more clearly describe technical solutions in embodiments of the present disclosure, the following will briefly introduce the drawings that need to be used in the description of the embodiments. Apparently, the drawings in the following description are only some embodiments of the present disclosure. For those skilled in the art, without creative efforts, other drawings can be obtained based on these drawings.

Figure 1:
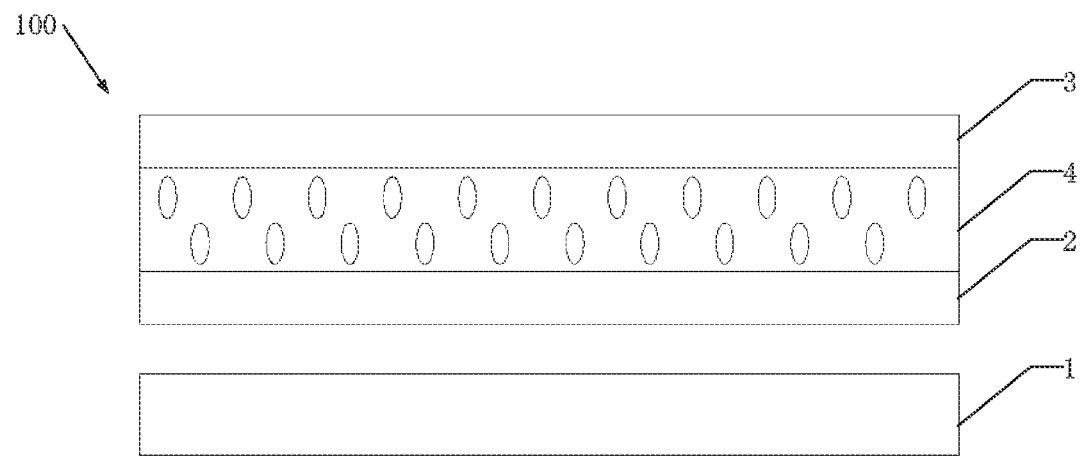
FIG. 1 is a cross-sectional view of a display panel of a first embodiment of the present disclosure.

Reference numerals are as follows:
100, display panel
1, backlight module; 2, array substrate
3, color filter substrate; 4, liquid crystal layer
11, bottom frame; 12, sealant
13, optical film; 14, light guide plate
15, light source; 16, reflector
17, double-sided adhesive tape; 18, engaging male terminal
19, engaging female terminal; 20, position limiting block
111, bottom plate; 112, side plate
131, first optical film; 132, second optical film
133, third optical film; 134, first engagement structure
1321, first through hole; 1331, second through hole
121, sealant body; 122, extension plate
123, second engagement structure

DESCRIPTION OF SPECIFIC EMBODIMENTS OF THE INVENTION

Preferred embodiments of the present disclosure are described in detail below with reference to the accompanying drawings in this specification, to completely describe technical content of the present disclosure to a person skilled in the art, to prove, by using examples, that the present disclosure can be implemented, so that the technical content disclosed in the present disclosure is clearer, and it is more easy for a person skilled in the art to understand how to implement the present disclosure. However, the present disclosure may be embodied by using many different forms of embodiments, the protection scope of the present disclosure is not limited to the embodiments mentioned in this specification, and descriptions of the following embodiments are not intended to limit the scope of the present disclosure.

Terms about directions mentioned in the present disclosure, such as "upper", "lower", "front", "rear", "left", "right", "in", "out", and "side surface" merely refer to directions in the accompanying drawings. The direction terms used in this specification are intended to explain and describe the present disclosure, but are not intended to limit the protection scope of the present disclosure.

In the accompanying drawings, components having a same structure are represented by a same numeral, and components having similar structures or functions are represented by similar numerals. In addition, for ease of understanding and description, a size and a thickness of each component shown in the accompanying drawings are arbitrarily shown, and the size and the thickness of each component are not limited in the present disclosure.

As shown in FIG. 1, an embodiment provides a display panel 100. The display panel 100 includes a backlight module 1, an array substrate 2, a color filter substrate 3, and a liquid crystal layer 4. The array substrate 2 is disposed on one side of the backlight module 1. The color filter substrate 3 is disposed opposite to the array substrate 2, and is disposed on the array substrate 2 away from the backlight module 1. The liquid crystal layer 4 is disposed between the array substrate 2 and the color filter substrate 3.

Figure 2:
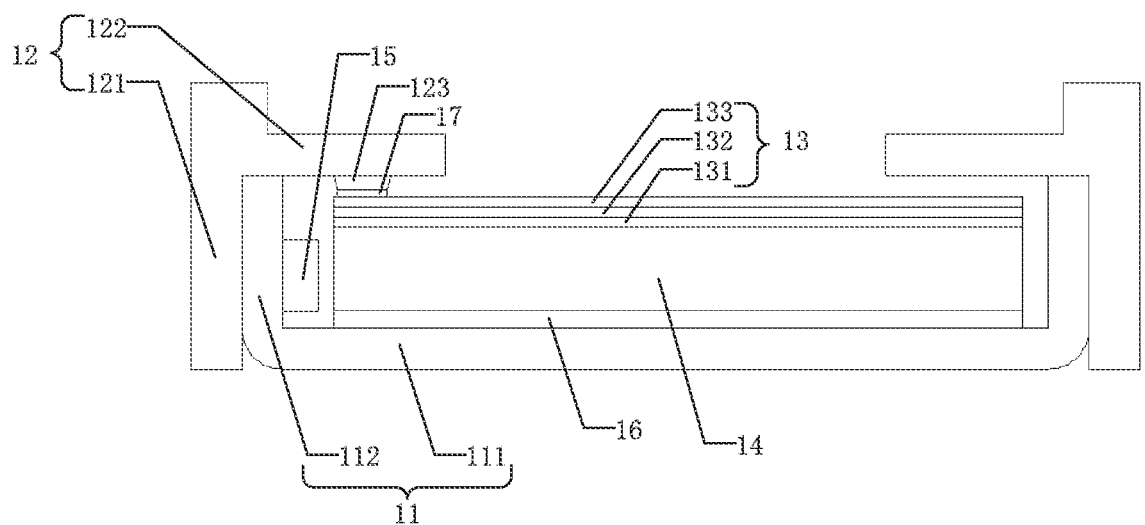
FIG. 2 is a first cross-sectional view of a backlight module of the first embodiment of the present disclosure.

As shown in FIG. 2, the backlight module 1 includes a bottom frame 11, a sealant 12, an optical film 13, a light guide plate 14, a light source 15, and a reflector 16.

As shown in FIG. 2, the bottom frame 11 includes a bottom plate 111 and a side plate 112 connected to a periphery of the bottom plate 111. The bottom plate 111 and the side plate 112 together form an accommodation chamber.

As shown in FIG. 2 to FIG. 5, the optical film 13 is disposed above the bottom plate 111 and disposed in the accommodation chamber. A first engagement structure 134 is disposed on a surface of the optical film 13 away from the bottom plate 111.

As shown in FIG. 2, the optical film 13 of this embodiment includes a first optical film 131, a second optical film 132, and a third optical film 133.

The first optical film 131 is disposed above the bottom plate 111 and disposed in the accommodation chamber. The second optical film 132 is disposed on a surface of the first optical film 131 away from the bottom plate 111. The third optical film 133 is disposed on a surface of the second optical film 132 away from the bottom plate 111. In this embodiment, the first optical film 131 and the third optical film 133 are diffusion sheets, which are configured to diffuse light received by the light guide plate 14 so that the light can propagate in a direction of the array substrate 2, thereby widening the viewing angle. The second optical film 132 is a prism sheet, which is configured to concentrate the diffused light and emit it within a certain angle, so as to achieve a purpose of improving brightness of the display panel 100.

Figure 3:
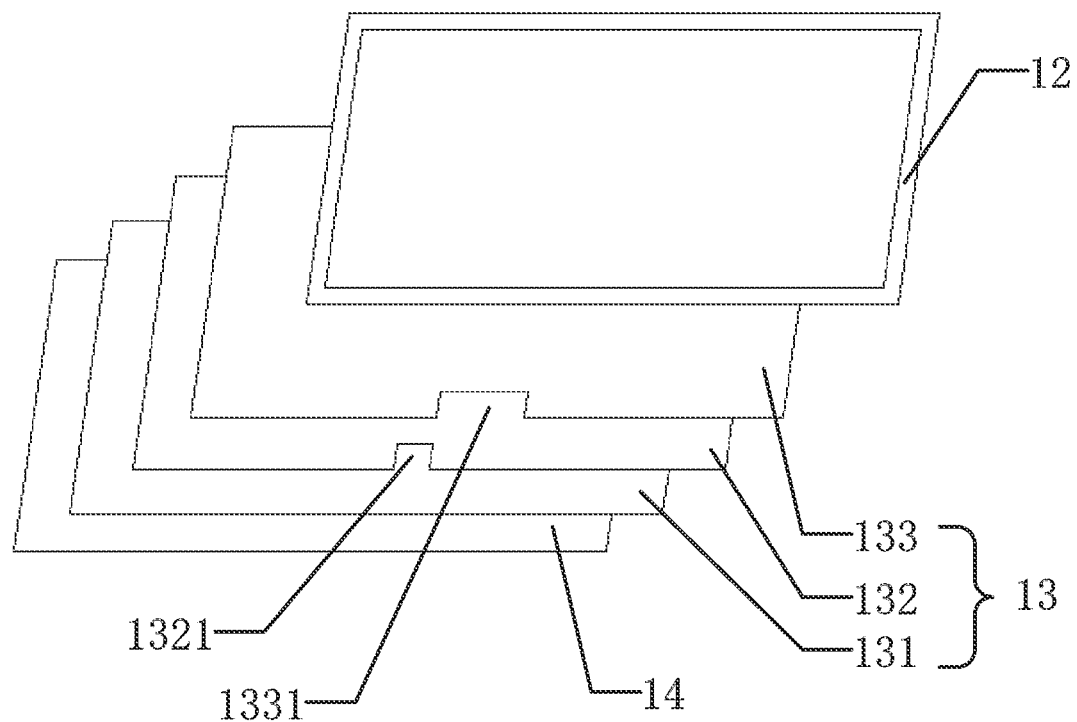
FIG. 3 is a schematic diagram of a sealant, an optical film, and a light guide plate of the backlight module of the first embodiment of the present disclosure.

As shown in FIG. 3, the second optical film 132 includes a first through hole 1321. The third optical film 133 includes a second through hole 1331. At least a part of the first through hole 1321 is formed in the second through hole 1331, so that a subsequent double-sided adhesive tape 17 can fix the first optical film 131, the second optical film 132, the third optical film 133, and the sealant 12 at the same time.

In this embodiment, the first through hole 1321 is completely disposed in the second through hole 1331. The first engagement structure 134 formed by the first through hole 1321 and the second through hole 1331 is a first step-shaped structure. In other embodiments, a shape of the first engagement structure 134 may also be zigzag or wavy.

A length of the first through hole 1321 ranges from 15 to 25 mm. If the length of the first through hole 1321 is less than 15 mm, a contact area between the double-sided adhesive tape 17 and the third optical film 133 is too small, which reduces a fixing effect of the third optical film 133. If the length of the first through hole 1321 is greater than 25 mm, an overall performance of the second optical film 132 is easily reduced, and it is likely to cause breakage. In this embodiment, the length of the first through hole 1321 is 20 mm.

A width of the first through hole 1321 ranges from 1 to 3 mm. In this embodiment, the width of the first through hole 1321 is 2 mm. If the width of the first through hole 1321 is less than 1 mm, the contact area between the double-sided adhesive tape 17 and the third optical film 133 is too small, which reduces the fixing effect of the third optical film 133. If the width of the first through hole 1321 is greater than 3 mm, a width of a corresponding second engagement structure 123 will increase, thereby increasing a width of the extension plate 122 of the sealant 12 of the display panel 100, and ultimately reducing a narrow bezel effect of the display panel 100. In this embodiment, the width of the first through hole 1321 is 2 mm.

In consideration of the width of the extension plate 122 of the sealant 12, in this embodiment, a width of the second through hole 1331 is the same as the width of the first through hole 1321. That is, in this embodiment, the width of the second through hole 1331 is 2 mm.

In order to realize that the first through hole 1321 is formed in the second through hole 1331 and to ensure the contact area between the double-sided adhesive tape 17 and the second optical film 132, a length of the second through hole 1331 needs to be 15-25 mm greater than the length of the first through hole 1321. In this embodiment, the length of the second through hole 1331 is greater than the length of the first through hole 1321 by 20 mm. That is, in this embodiment, the length of the second through hole 1331 is 40 mm.

As shown in FIG. 2, the sealant 12 surrounds an outside of the side plate 112 and extends to cover a surface of the optical film 13 away from the bottom plate 111. Specifically, the sealant 12 includes a sealant body 121 and an extension plate 122 connected to one end of the sealant body 121. In this embodiment, the sealant body 121 is parallel to the side plate 112 of the bottom frame 11. The extension plate 122 is perpendicular to the side plate 112 of the bottom frame 11.

As shown in FIG. 2, a second engagement structure 123 is disposed on a surface of the extension plate 122 of the sealant 12 facing the optical film 13. The second engagement structure 123 is engaged with the first engagement structure 134, and disposed on a side of the optical film 13 away from the bottom plate 111. Since the first engagement structure 134 of this embodiment is the first step-shaped structure, in this embodiment, the second engagement structure 123 is a second step-shaped structure that is engaged with the first step-shaped structure. In other embodiments, a shape of the second engagement structure 123 may also be zigzag or wavy.

In this embodiment, the first engagement structure 134 is disposed on the surface of the optical film 13 away from the bottom plate 111. The second engagement structure 123 is disposed on the extension plate 122 of the surface of the sealant 12 facing the optical film 13. The first engagement structure 134 and the second engagement structure 123 are engaged to each other. The sealant 12 and the bottom frame 11 are fixed to each other to fix the optical film 13, thereby preventing a shift and vibration scratches of the optical film 13. Therefore, it is prevented to set a positioning post for fixing the optical film 13 on the light guide plate 14. The surface of the light guide plate 14 of this embodiment does not require a special structure, which solves the problem that the thermal-pressing light guide plate 14 cannot be designed with a protruding structure on its surface in the prior art, thereby improving the applicability of the thermal-pressing process of the light guide plate 14.

As shown in FIG. 2, the light guide plate 14 is disposed between the bottom plate 111 and the optical film 13 and is disposed in the accommodation chamber. The light guide plate 14 is mainly configured to convert light emitted by the light source 15 into a surface light source and transmit it to the optical film 13 on the light guide plate 14, and finally to the array substrate 2, the liquid crystal layer 3, and the color filter substrate 4 to realize display of the display panel 100.

Figure 6:
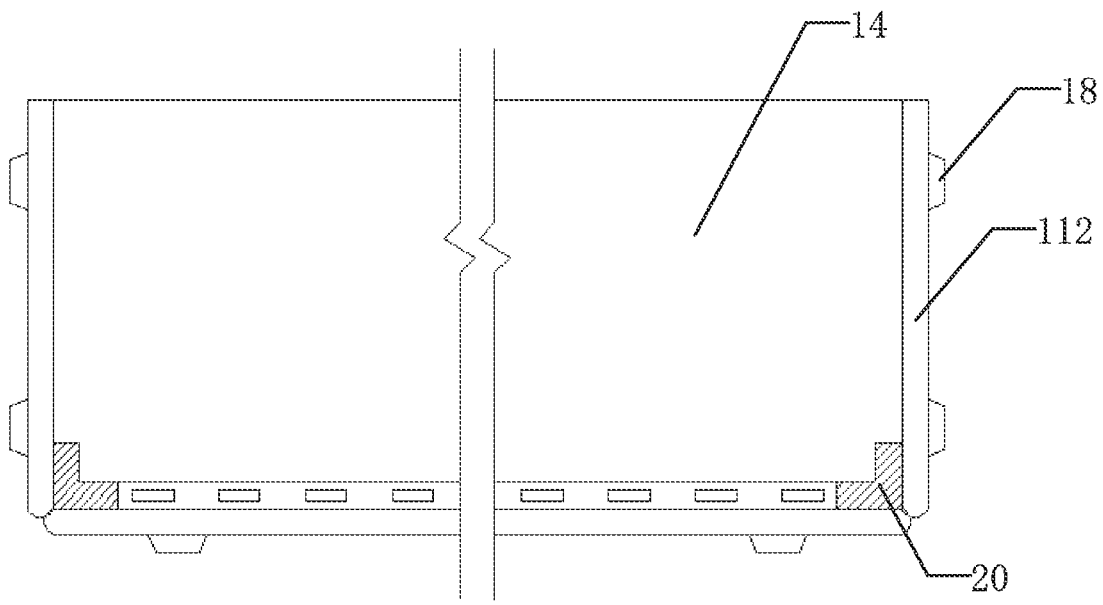
FIG. 6 is a partial top view of the display panel of the first embodiment of the present disclosure.

As shown in FIG. 6, the backlight module 1 also includes a position limiting block 20. The position limiting block 20 is disposed between the light guide plate 14 and the side plate 112 of the bottom frame 11. In this embodiment, material of the position limiting block 20 is rubber. In other embodiments, the position limiting block 20 may also be made of other materials, which is not limited in this embodiment. The position limiting block 20 is mainly configured to prevent shift and dislocation of the light guide plate 14 in a direction parallel to the bottom plate 111.

As shown in FIG. 2, the light source 15 is disposed between the light guide plate 14 and the side plate 112 and fixed on an inner side wall of the side plate 112. The light source 15 in this embodiment is a light bar. The present disclosure does not limit types of the light source 15. The light source 15 of this embodiment is fixed on the inner side wall of the side plate 112 through a thermally conductive adhesive.

As shown in FIG. 2, in considering that a width of the extension plate 122 of the sealant 12 on a side where the light source 15 is provided is greater than a width of the extension plate 122 of the sealant 12 on the other side where the light source 15 is not provided, there is a sufficient width for disposing the second engagement structure 123. In this embodiment, the second engagement structure 123 is disposed on the extension plate 122 of the sealant 12 on the side where the light source 15 is provided. That is, the second engagement structure 123 and the light source 15 are disposed on the same side. Since the second engagement structure 123 and the first engagement structure 134 are engaged with each other, the second engagement structure 123 and the first engagement structure 134 are set correspondingly. Therefore, the first engagement structure 134 and the light source 15 are disposed on the same side.

When the backlight module 1 is working, heat generated by the light source 15 will cause the optical film 13 to expand and contract. In this embodiment, in order to prevent the expansion and contraction of the optical film 13 from causing wrinkles to affect luminous effect of the backlight module, the second engagement structure 123 is only disposed on one side of the extension plate 122.

Heat generated when the backlight module 1 works will cause the optical film 13 to expand and contract. Moreover, the amount of expansion and contraction of the optical film 13 along length and width directions is proportional to its own length and width. That is, the amount of expansion and contraction along a long side is relatively large. Thus, in this embodiment, the second engagement structure 123 is disposed in a middle of the extension plate 122 of the sealant 12 where it is disposed. As a result, the optical film 13 can be fixed by the middle covered by the second engagement structure 123. The optical film 13 expands and contracts from a middle to both sides, so that an expansion and contraction space of the optical film 13 can be reasonably reserved to achieve a narrow bezel.

As shown in FIG. 2, the reflector 16 is disposed between the bottom plate 111 and the light guide plate 14. The reflector 16 is mainly configured to reflect light exposed at a bottom of the light guide plate 14 to the light guide plate 14 to improve the utilization of light. In this embodiment, the reflector 16 is fixed on a surface of the light guide plate facing the bottom plate 111.

Figure 4:
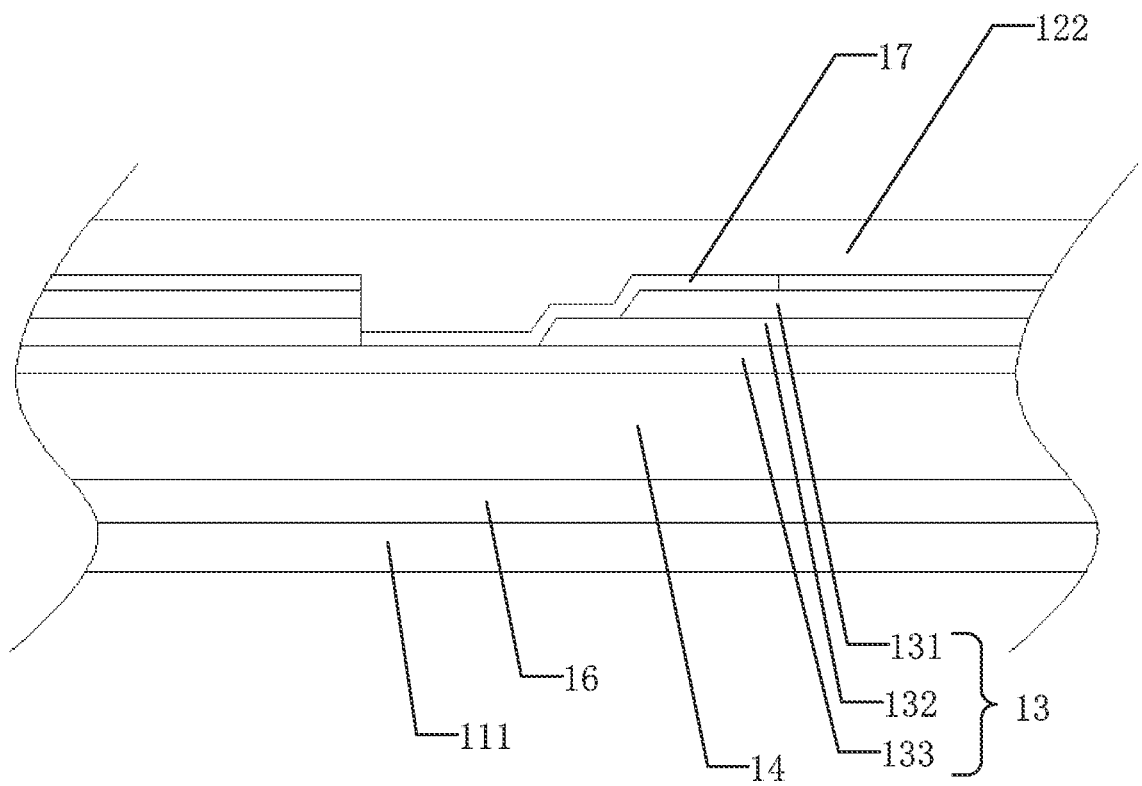
FIG. 4 is a second cross-sectional view of the backlight module of the first embodiment of the present disclosure.
Figure 5:
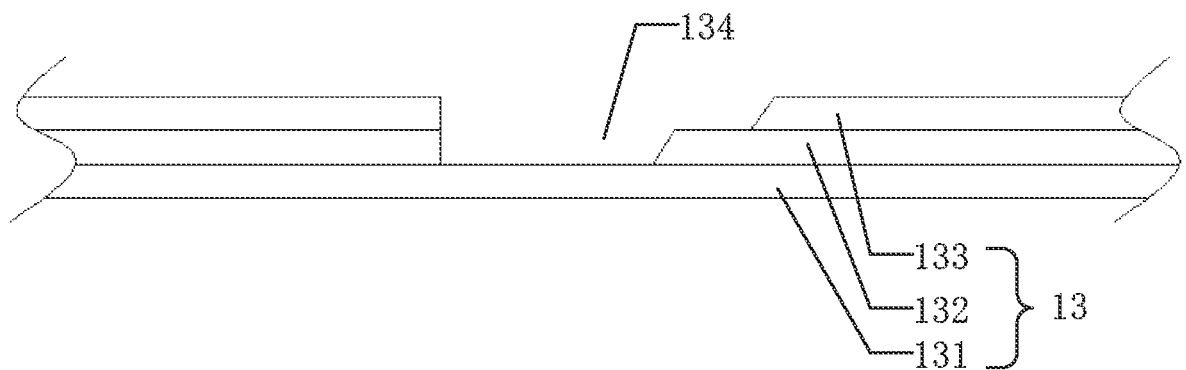
FIG. 5 is a schematic diagram of the optical film and a first engagement structure of the first embodiment of the present disclosure.

As shown in FIG. 4, the backlight module 1 also includes the double-sided adhesive tape 17. The double-sided adhesive tape 17 is attached between the first engagement structure 134 and the second engagement structure 123, and partially extends to cover the optical film 13. Therefore, the optical film 13 can be further fixed to prevent the optical film 13 from shifting and shaking.

In this embodiment, the double-sided adhesive tape 17 is a double-sided black-white adhesive tape, which has a black side and a white side. The black side faces the optical film 13. The white side faces the sealant 12. The black side can not only fix the optical film 13, but also absorb light at the optical film 13 near the first through hole 1321 and second through hole 1331, thereby preventing bright edges from appearing. To achieve the above effect, in this embodiment, a width of the double-sided adhesive tape is 2 mm.

Figure 7:
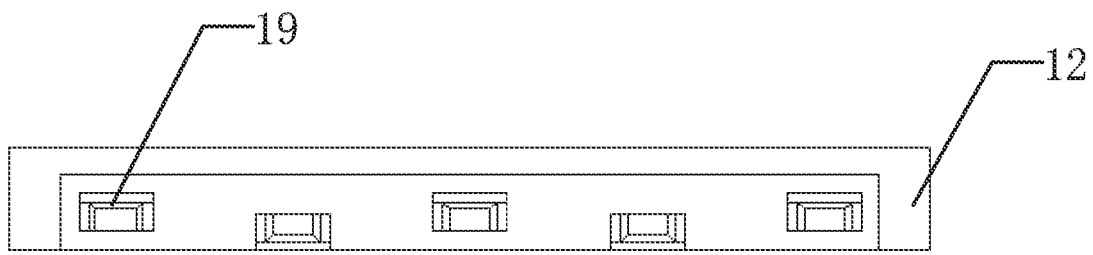
FIG. 7 is a side view of the sealant of the first embodiment of the present disclosure.

As shown in FIG. 6 and FIG. 7, the side plate 112 of this embodiment is fixed on the sealant 12 through a fastening structure. Specifically, an engaging male terminal 18 is formed on a surface of the side plate 112 facing the sealant body 121, and an engaging female terminal 19 is formed a surface of the sealant body 121 facing the side plate 112. By matching the engaging male terminal 18 and the engaging female terminal 19, the side plate 112 and the sealant body 121 are fixed. That is, the bottom frame 11 and the sealant 12 are fixed.

When the backlight module 1 of this embodiment is assembled, the bottom frame 11 and the sealant 12 are fixed to each other through the fastening structure. The reflector 16 is fixed on the light guide plate 14. The light guide plate 14 is disposed on the bottom plate 111. The optical film 13 is disposed on the surface of the light guide plate 14 away from the bottom plate 111. The optical film 13 is fixed to the sealant 12 through the first engagement structure 134, the second engagement structure 123, and the double-sided adhesive tape 17. When the bottom frame 11 and the sealant 12 are fixed, and the sealant 12 and the optical film 13 are fixed, the light guide plate 14 is fixed between the optical film 13 and the bottom plate 111.

The above is detailed introductions to the backlight module and the display panel of the present disclosure. In this specification, specific examples are used to illustrate the principle and implementation of the present disclosure. The description of the above embodiments is only used to help understand the method and core idea of the present disclosure. At the same time, for those skilled in the art, based on the idea of the present disclosure, there will be changes in the specific implementation and the scope of application. In summary, the contents of this specification should not be construed as a restriction on the present disclosure.

What is claimed is:

1. A backlight module, comprising:
a bottom frame comprising a bottom plate and a side plate connected to a periphery of the bottom plate, wherein the bottom plate and the side plate together form an accommodation chamber;
an optical film disposed on the bottom plate and disposed in the accommodation chamber;
a sealant surrounding on an outside of the side plate and extending to cover a surface of the optical film away from the bottom plate;
a first engagement structure formed on the surface of the optical film away from the bottom plate; and
a second engagement structure formed on a surface of the sealant facing the optical film,
wherein the second engagement structure and the first engagement structure are engaged with each other, and are disposed on a side of the optical film away from the bottom plate, wherein the optical film comprises:
a first optical film disposed on the bottom plate and disposed in the accommodation chamber;
a second optical film disposed on a surface of the first optical film away from the bottom plate; and
a third optical film disposed on a surface of the second optical film away from the bottom plate;
wherein the second optical film comprises a first through hole, the third optical film comprises a second through hole, at least one portion of the first through hole is formed in the second through hole, and the first through hole and the second through hole together form the first engagement structure,
wherein the first engagement structure formed by the first through hole and the second through hole is a first step-shaped structure, and the second engagement structure is a second step-shaped structure that engages with the first step-shaped structure, wherein a double-sided adhesive tape is attached between the first engagement structure and the second engagement structure, the double-sided tape is in contact with the first optical film, the second optical film and the third optical film, and the double-sided tape is configured to fix the first optical film, the second optical film, the third optical film and the sealant simultaneously.

2. The backlight module according to claim 1, further comprising:
a light guide plate disposed between the bottom plate and the optical film and disposed in the accommodation chamber; and a light source disposed between the light guide plate and the side plate and fixed on an inner side wall of the side plate;

wherein the first engagement structure is disposed on a same side as the light source.

3. The backlight module according to claim 1, wherein the sealant comprises:
   a sealant body parallel to the side plate of the bottom frame; and
   an extension plate connected to one end of the sealant body and perpendicular to the side plate of the bottom frame;
   wherein the second engagement structure is disposed in a middle of the extension plate of the sealant.

4. The backlight module according to claim 1, wherein the double-sided adhesive tape is a double-sided black-white adhesive tape comprising a black side and a white side; and
   wherein the black side faces the optical film, and the white side faces the sealant.

5. The backlight module according to claim 2, wherein the light source is fixed on the inner side wall of the side plate through a thermally conductive adhesive.

6. The backlight module according to claim 1, wherein the side plate is fixed to the sealant through a fastening structure.

7. A display panel, comprising a backlight module, wherein the backlight module comprises:
   a bottom frame comprising a bottom plate and a side plate connected to a periphery of the bottom plate, wherein the bottom plate and the side plate together form an accommodation chamber;
   an optical film disposed on the bottom plate and disposed in the accommodation chamber;
   a sealant surrounding on an outside of the side plate and extending to cover a surface of the optical film away from the bottom plate;
   a first engagement structure formed on the surface of the optical film away from the bottom plate; and
   a second engagement structure formed on a surface of the sealant facing the optical film,
   wherein the second engagement structure and the first engagement structure are engaged with each other, and are disposed on a side of the optical film away from the bottom plate, wherein the optical film comprises:
   a first optical film disposed on the bottom plate and disposed in the accommodation chamber;
   a second optical film disposed on a surface of the first optical film away from the bottom plate; and
   a third optical film disposed on a surface of the second optical film away from the bottom plate;
   wherein the second optical film comprises a first through hole, the third optical film comprises a second through hole, at least one portion of the first through hole is formed in the second through hole, and the first through hole and the second through hole together form the first engagement structure,
   wherein the first engagement structure formed by the first through hole and the second through hole is a first step-shaped structure, and the second engagement structure is a second step-shaped structure that engages with the first step-shaped structure, wherein a double-sided adhesive tape is attached between the first engagement structure and the second engagement structure, the double-sided tape is in contact with the first optical film, the second optical film and the third optical film, and the double-sided tape is configured to fix the first optical film, the second optical film, the third optical film and the sealant simultaneously.

8. The display panel according to claim 7, further comprising:
   a light guide plate disposed between the bottom plate and the optical film and disposed in the accommodation chamber; and
   a light source disposed between the light guide plate and the side plate and fixed on an inner side wall of the side plate;
   wherein the first engagement structure is disposed on a same side as the light source.

9. The display panel according to claim 7, wherein the sealant comprises:
   a sealant body parallel to the side plate of the bottom frame; and
   an extension plate connected to one end of the sealant body and perpendicular to the side plate of the bottom frame;
   wherein the second engagement structure is disposed in a middle of the extension plate of the sealant.

10. The display panel according to claim 7, wherein the double-sided adhesive tape is a double-sided black-white adhesive tape comprising a black side and a white side; and
    wherein the black side faces the optical film, and the white side faces the sealant.

11. The display panel according to claim 8, wherein the light source is fixed on the inner side wall of the side plate through a thermally conductive adhesive.

12. The display panel according to claim 7, wherein the side plate is fixed to the sealant through a fastening structure.

* * * * *